United States Patent [19]

Fleck et al.

[11] Patent Number: 4,563,717
[45] Date of Patent: Jan. 7, 1986

[54] HELICAL SCAN CASSETTE RECORDER WITH IMPROVED TAPE THREADING

[75] Inventors: Harald Fleck, Vienna, Austria; Johannes C. A. Muller, Eindhoven, Netherlands; Heinrich Hütter, Vienna, Austria

[73] Assignee: U.S. Philips Corporation, New York, N.Y.

[21] Appl. No.: 403,374

[22] Filed: Jul. 30, 1982

[30] Foreign Application Priority Data

Sep. 8, 1981 [AT] Austria ............................... 3884/81
Mar. 15, 1982 [AT] Austria ............................... 1032/82

[51] Int. Cl.⁴ .................. G11B 15/66; G11B 5/008
[52] U.S. Cl. ........................................ 360/95; 360/85
[58] Field of Search .................. 360/85, 95, 83–84, 360/93

[56] References Cited

U.S. PATENT DOCUMENTS

| | | | |
|---|---|---|---|
| 4,045,820 | 8/1977 | Starr ........................................ | 360/85 |
| 4,060,840 | 11/1977 | Umeda .................................. | 360/85 |
| 4,092,686 | 5/1978 | Schulz .................................... | 360/85 |
| 4,138,699 | 2/1979 | Ura et al. .............................. | 360/85 |
| 4,258,399 | 3/1984 | Fijima et al. ......................... | 360/85 |
| 4,323,936 | 4/1982 | Beitler et al. ......................... | 360/95 |
| 4,388,658 | 6/1983 | Kajino et al. ......................... | 360/85 |

Primary Examiner—Stuart N. Hecker
Assistant Examiner—David J. Severin
Attorney, Agent, or Firm—David R. Treacy

[57] ABSTRACT

A tape threading device for a helical scan tape cassette recorder, having pivotal levers each having a tape guide for withdrawing and wrapping the tape about a guide drum. The levers overlap each other at an area of instantaneous overlap at which they are coupled to each other by a mechanism including a sliding block which is guided by a carrier device along a path which extends in the area of overlap. The sliding block is in force-sustained engagement with a link-motion surface on at least one of the levers.

17 Claims, 9 Drawing Figures

HELICAL SCAN CASSETTE RECORDER WITH IMPROVED TAPE THREADING

BACKGROUND OF THE INVENTION

The invention relates to a recording and/or reproducing apparatus for use in conjunction with a record carrier in the form of a tape contained in a cassette which has at least one aperture for withdrawing the record carrier from said cassette and which can be inserted into the apparatus. The apparatus comprises a tape-guide drum around whose circumferential surface the record carrier, which has been withdrawn from the cassette, can be wrapped at least partly and a tape-guide device for withdrawing the record carrier from the cassette and wrapping it around the tape-guide drum. This kind of apparatus will be referred to as a helical scan cassette recorder.

More particularly, the invention relates to such an apparatus in which the tape-guide device comprises two levers which are pivotable about two parallel pivotal axes. The levers overlap each other in an area of overlap which varies as they are pivoted. Each carries at least one tape guide which is adapted to cooperate with the record carrier, and can be pivoted, by means of a driving device, between a rest position, in which the tape guides are located behind the record carrier in the cassette at the location of the aperture in said cassette, and an operating position, in which the tape guides keep the record carrier, which is taken along when the levers are pivoted from their rest positions to their operating positions, wrapped around the tape-guide drum. The levers are coupled to each other by a coupling device which acts directly on the levers for coordinating their pivotal movements. Such a helical scan cassette recorder is for example known from U.S. Pat. No. 4,323,936.

The coordination of the pivotal movements of the two levers is important because the two levers and the tape guides which they carry should be moved between their rest positions and their operating positions with a coordinated movement which is as uniform as possible. Smooth motion is required to ensure that the record carrier is not subjected to an undesired load during movement of the levers. Also, to guarantee a correct and undisturbed operation they must reach their operating positions or their rest positions at the same time. In the apparatus described in U.S. Pat. No. 4,323,936 the two levers are therefore coupled to each other by a coupling device comprising a cable, the cable being connected to the two levers at fixed points of attachment. When such a coupling device is used, as a result of the constant length of the cable and the fixed points of attachment of the cable to the two levers, the two levers behave similarly in each stage of their actuating movements, so that their pivotal movements cannot be adapted to each other arbitrarily. Further, mounting such a cable is comparatively intricate and ageing of the cable may have an adverse effect on the reliability of operation.

SUMMARY OF THE INVENTION

An object of the invention is to provide a particularly simple and reliable coupling device between the two levers for the tape guides in a helical scan cassette recorder.

Another object is to couple the two levers so that their movements can be adapted to each other in the desired manner in all movement stages.

In accordance with the invention, the coupling device comprises a link-motion mechanism which comprises a sliding block which extends in the same direction as the pivotal axes of the two levers. The block is in force-sustained engagement with the two levers at the location of their area of instantaneous overlap, and is in force-sustained cooperation with a carrier device which is movable transversely of the pivotal axes. The carrier device moves the sliding block along a path of movement which is defined by the carrier device. The path extends through the area of instantaneous overlap of the two levers, the force-sustained engagement of the sliding block with at least one of the two levers being obtained through a link-motion surface on that lever. The link-motion surface extends within the area of instantaneous overlap and corresponds to the path of movement of the sliding block, the sliding block being urged against the link-motion surface as it moves along the surface. This provides a simple and reliable coupling between the two levers. Further, the shape of the path of movement of the sliding block and the shape of the link-motion surface along which the sliding block moves during actuation the two levers permit arbitrary adaptation of the pivotal movements of the two levers to each other. Such a coupling device comprising a link-motion mechanism also has the advantage that it can be mounted simply and rapidly.

It is found to be advantageous if the carrier device for the sliding block is a separate actuating member which is movable relative to the two levers, each of the two levers comprises a link-motion surface, which surfaces also overlap each other at the location of the area of instantaneous overlap of the two levers, and the sliding block is in force-sustained engagement with the two link-motion surfaces at the location of the area of overlap. The use of a separate actuating member as the carrier device for the sliding block permits the path of movement for the sliding block to be optimized so as to ensure a correct and undisturbed force transmission between the sliding block and the two link-motion surfaces. The path of movement of the sliding block, relative to each of the two link-motion surfaces during actuation of the levers, has a comparatively short length as a result of its arrangement on a separate actuating member and its movement relative to two link-motion surfaces so that the link-motion surfaces themselves may be comparatively short. This arrangement is advantageous in view of the required space, and it permits compact construction of the levers.

The separate actuating member may, for example, be constructed as a rotatable disk or ring. However, it is found to be particularly advantageous if the separate actuating member for the sliding block is a pivotally journalled arm. This results in a particularly simple and compact construction.

In this respect it is also advantageous if, viewed along the pivotal axes, the arm is situated between the two levers and if the sliding block extends through the arm and each of its two free ends is in force-sustained engagement with one of the two link-motion surfaces. This permits the arm, which serves as actuating member, and its bearing arrangement to be loaded uniformly, which is of advantage for a correct operation and a long life.

According to a further advantageous embodiment, the separate actuating member for the sliding block is a sliding member which is slidable along a guide. This results in a very stable construction.

In another preferred embodiment the carrier device for the sliding block is formed by one of the two levers and the other one of the two levers comprises the link-motion surface with which the sliding block is in force-sustained engagement. Since one of the two levers itself is also utilized as carrier device for the sliding block, a separate actuating member for the carrier device may be dispensed with and a particularly simple and compact construction is obtained.

In order to obtain a very simple construction it is found to be advantageous if the link-motion surface is formed on a side wall of the relevant lever.

In a different preferred embodiment, the link-motion surface is formed by a slot in the relevant lever, through which slot the sliding block extends. This guarantees a correct and reliable cooperation of the sliding block with the link-motion surfaces during each movement of the two levers.

Moreover, it is preferable if the carrier device for the sliding block is formed by both levers. Each lever has a slot for the formation of a link-motion surface, the two slots also overlap each other in the area of instantaneous overlap of the two levers, and the sliding block floats in these slots in the area of overlap. The shape of each slot substantially corresponds to a portion of a circular involute whose base circle is centered relative to the pivotal axis of the relevant lever, the two base circles being tangent to each other at a tangent line which extends perpendicularly to the plane in which the two pivotal axes lie, and the ratio of the diameters of the two base circles being inversely proportional to the ratio of the pivoting angles of the two levers. In this way a separate actuating member may be dispensed with and the sliding block is guided accurately along a path of movement by the two levers themselves during their movement, the travel of the sliding block relative to each of the two slot-shaped link-motion surfaces during the movement of the levers being only short as a result of the movement of this block relative to two link-motion surfaces. This arrangement permits the slots themselves to be very short, which is of advantage for a compact construction of the levers. Since the shape of each of the two slots corresponds to a portion of a specific circular involute, the carrier device for the sliding block, which device is formed by the two levers, defines a rectilinear path of movement for the block. As a result of the rectilinear path of movement of the sliding member and the circularly involute shape of the two slots, the pivotal movements of the two levers are coordinated in such a way that the two levers, which are coupled to each other via the link-motion mechanism, each perform a similar pivotal movement which corresponds to a rolling movement of the two base circles of the circular involutes on each other. Further, during the pivotal movement of the two levers the forces between the sliding block and the slots which serve as link-motion surfaces are always directed perpendicularly to the bounding walls of the slots, which is of advantage for a smooth and correct force transmission.

In a simple advantageous embodiment the sliding block is a cylindrical pin.

Furthermore, it is found to be advantageous if the sliding block comprises a rotatable roller which is adapted to cooperate with at least one link-motion surface. As a result, the sliding block can perform a rolling movement relative to the link-motion surface. This type of movement produces a low friction of the link-motion mechanism.

Six embodiments of the invention will now be described in more detail, by way of non-limitative example.

DESCRIPTION OF THE PREFERRED EMBODIMENTS

Figure 1:
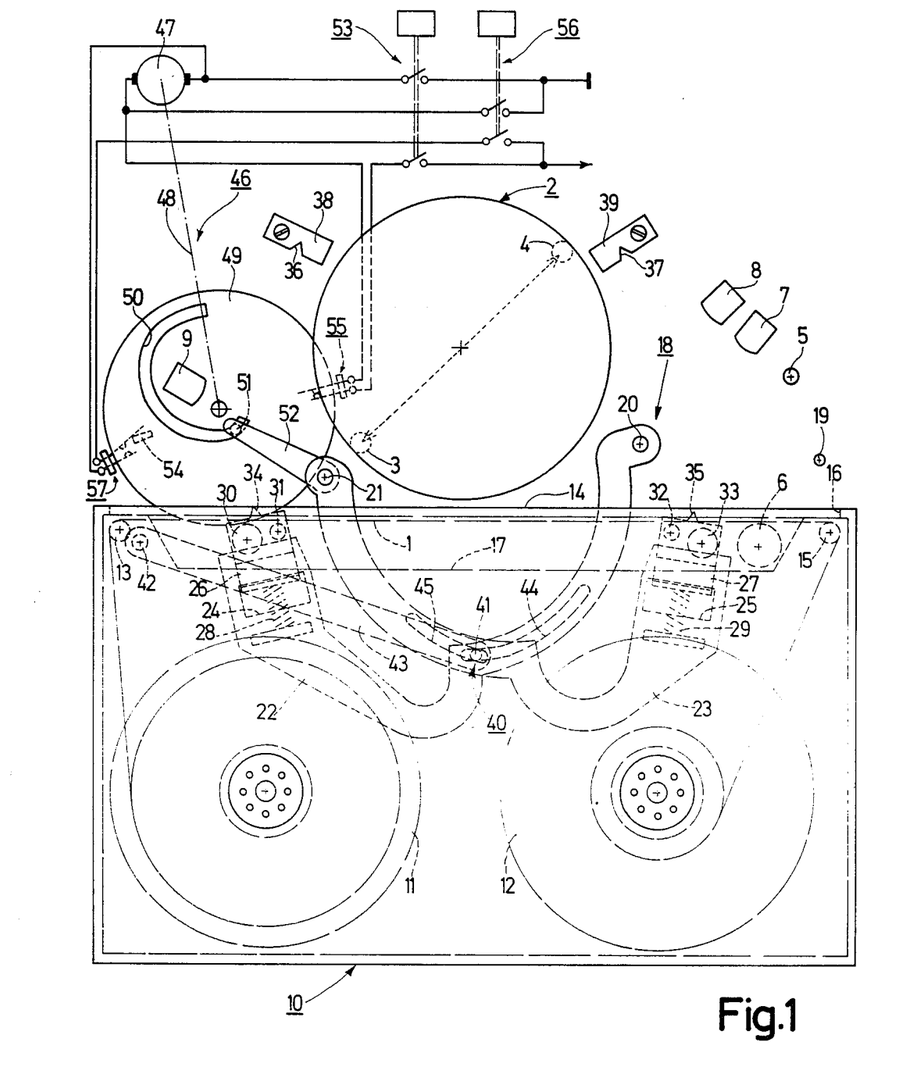
FIG. 1 is a schematic plan view of the relevant parts of a first embodiment of a helical scan cassette apparatus in accordance with the invention, the two levers being shown in their rest positions.
Figure 2:
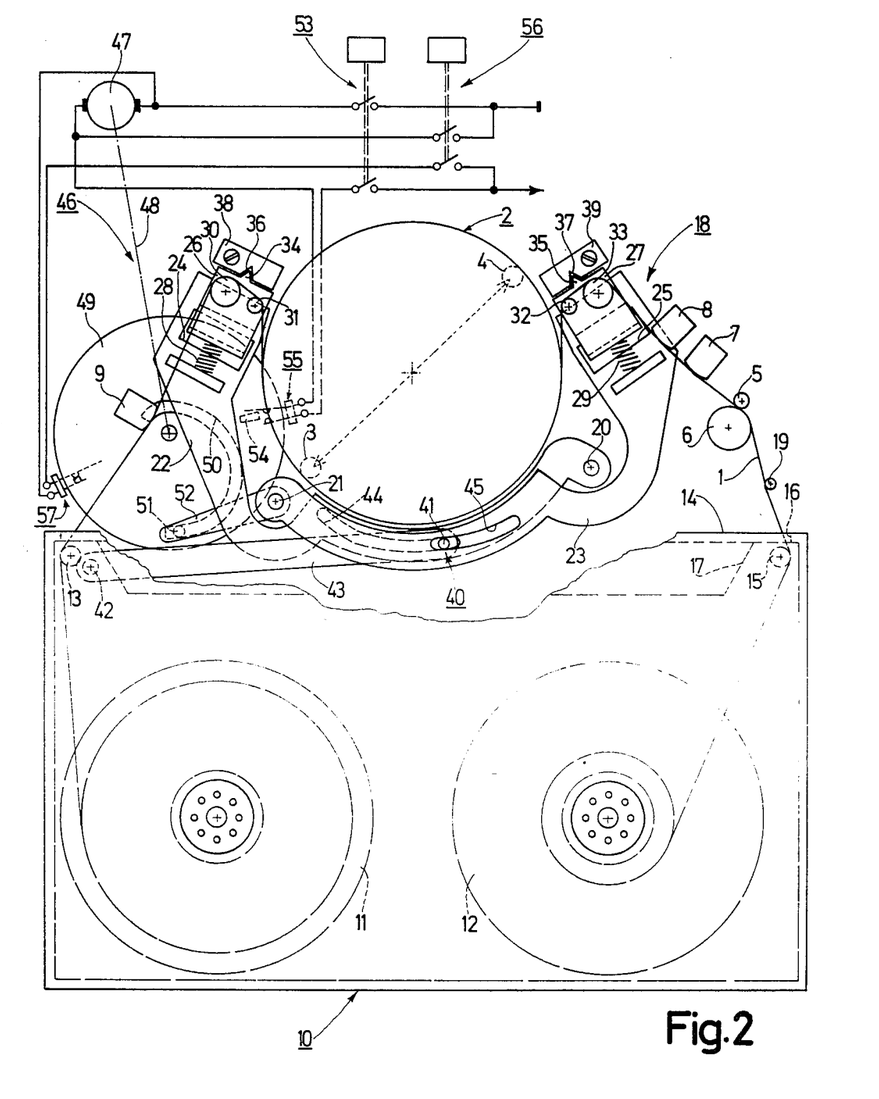
FIG. 2 is a similar view of the apparatus shown in FIG. 1, the two levers of the tape-guide device being shown in their operating positions.

FIGS. 1 and 2 schematically show a video cassette recorder using a magnetizable record carrier 1 in the form of a tape (the carrier is hereinafter referred to as "tape"). The apparatus comprises a tape-guide drum 2, around whose circumferential surface the tape 1 can be wrapped in a helical path through an angle of substantially 180°. Inside the tape guide drum 2 two schematically shown rotary magnetic heads 3 and 4 are arranged, which heads cooperate with the tape 1 wrapped around the drum through a gap which is formed in the drum 2 and which divides the drum substantially into two drum halves, which heads scan the moving tape along tracks which are inclined relative to the longitudinal direction of the tape, the magnetic heads 3 and 4 recording television signals on or reproducing said signals from the tape. For the transport of the tape 1 which has been wrapped around the tape-guide drum 2 the apparatus comprises a capstan 5, against which the tape can be pressed by means of a pressure roller 6 which is arranged on the apparatus so as to be movable, in a manner not shown.

Further, the apparatus comprises a stationary magnetic head 7 by means of which a track which extends in the longitudinal direction of the tape 1 can be scanned in order to record or reproduce an audio signal associated with the television signals. Adjacent the magnetic head 7 a further stationary magnetic head 8 is arranged, by means of which the same track as scanned by the magnetic head 7 can be scanned in order to erase audio signals recorded in this track. A further stationary magnetic head 9 enables both the television signals recorded in the inclined tracks and the associated audio signals recorded in the longitudinal track of the tape to be erased simultaneously.

As can be seen in FIGS. 1 and 2, the tape 1 is contained in a substantially rectangular cassette 10 which can be inserted into the apparatus and whose cassette housing comprises two major walls and four side walls and, for taking up the tape, contains two adjacent rotatable reels 11 and 12 between which the tape extends. The tape 1 extends in the cassette from the first reel 11, which serves as supply reel, over a first guide roller 13, along the side wall 14, and over a second guide roller 15 to the second reel 12, which serves as a take-up reel. In the side wall 14 the cassette 10 is formed with an aperture 16 through which the tape can be withdrawn from the cassette in order to wrap it around the tape-guide drum 2. In its center the aperture 16 continues as a trough-shaped recess 17 in a major wall of the cassette housing. In order to protect the exposed length of the tape 1 at the location of the aperture 16 in the side wall 14 of the cassette housing the cassette 10 comprises a cassette cover which is movable relative to the cassette housing, which cover automatically exposes the length of tape upon insertion of the cassette into the apparatus and which for the sake of clarity and simplicity is not shown, because it is not relevant to the present invention.

For withdrawing the tape 1 from the cassette 10 and wrapping it around the tape-guide drum 2 the apparatus comprises a tape-guide device 18. When the tape 1 has been wrapped around the tape-guide drum 2 by the tape-guide device 18 and the pressure roller 6 has been moved towards the capstan 5, which movement may be derived from and controlled by the movement of the tape-guide device 18, the tape can cooperate with the magnetic heads 7, 8 and 9, with the capstan 5, and with a tape-guide post 19. The tape-guide device 18 comprises two plate-shaped levers 22 and 23 which are each pivotable about a pivotal axis 20 and 21 respectively and which overlap each other in an area of overlap which varies during the pivotal movements. The area of overlap of the two levers is that area in which the two levers—viewed along the parallel pivotal axes 20 and 21—overlap each other. This area of overlap changes during the pivotal movements of the two levers, as can be seen in FIGS. 1 and 2. In this embodiment the area of overlap of the two levers 22 and 23 in the position shown in FIG. 1 is smaller than in the position shown in FIG. 2.

At its free end each of the two levers is formed with a rectangular aperture 24 and 25 respectively, receiving a U-shaped bracket 26 and 27 respectively, which is spring-loaded towards the free end of the respective lever 22 or 23 by a pressure spring 28 or 29 respectively which acts on the lever 22 or 23 respectively. One of the two limbs of each U-shaped bracket 26 and 27 carries two tape guides 30, 31 and 32, 33 respectively, shown schematically in FIGS. 1 and 2. The tape guides 30 and 33 are, for example, constructed as rotatable rollers and the tape guides 31 and 32 as stationary pins. The two limbs of each U-shaped bracket 28 and 27 respectively are positioned against the plate-shaped levers 22 and 23 respectively on both sides, so that the position of each bracket and the tape guides arranged thereon in the axial direction of the tape guide rollers 30 and 33 is defined. For the sake of completeness it is to be noted that the pins 31 and 32 and the tape guide drum 2 are inclined relative to the other parts which cooperate with the tape, in order to obtain the desired helical path of the tape 1 around the tape guide drum 2, which for the sake of simplicity and clarity is not shown.

By means of a driving device to be described in more detail hereinafter the levers 22 and 23 of the tape-guide device 18 are pivotable between a rest position, which is shown in FIG. 1 and in which the tape guides 30, 31, 32 and 33 are located behind the tape 1 in the cassette 10 at the location of the aperture 16, the tape guides being introduced into the cassette through the trough-shaped opening 17, and an operating position, which is shown in FIG. 2 and in which the tape guides keep the tape 1, which has been taken along during the pivotal movement of the two levers from the rest position to their operating position, wrapped around the tape-guide drum 2. In the rest position of the two levers 22 and 23 the main body of each U-shaped bracket 26 and 27 bears against that bounding wall of the rectangular aperture 24 or 25, respectively, which faces the free end of the relevant lever 22 or 23, respectively, under the influence of the pressure springs 28 and 29 respectively. In the operating position of the two levers the free end of each bracket, which ends each have a wedge-shaped projection 34 and 35 respectively, bears against a positioning block 38 and 39 respectively formed with a V-shaped groove 36 and 37 respectively, the wedge-shaped projections 34 and 35 engaging the V-shaped grooves 36 and 37. This ensures an accurate positioning of the brackets 26 and 27 and the tape guides 30, 31, 32 and 33 on these brackets in the operating position of the two levers 22 and 23. As can be seen in FIG. 2, the main bodies of the brackets 26 and 27 are then lifted off those bounding walls of the apertures 24 and 25 which face the free ends of the levers against the action of the pressure springs 28 and 29, which is simply achieved in that the two levers are moved from their rest position into their operating position with a specific overtravel. In this way the pressure springs 28 and 29 keep the free ends of the brackets 26 and 27 urged against the positioning blocks 38 and 39.

When the two levers are pivoted between their rest position, and their operation position it is essential that they perform a uniform and accurately coordinated movement, in order to prevent the tape guides on the levers from exerting an undesired load on the tape and in order to ensure that the two levers and the tape guides on these levers always reach their rest positions and operating positions at the same time. This synchronization ensures that in the rest position of the levers the tape guides are always located behind the tape and in the operating position of the levers the tape is correctly and exactly wrapped around the tape-guide drum. In order to coordinate the pivotal movements of the two levers 22 and 23 to each other these levers are coupled to each other by a coupling device which acts directly on these levers. The coupling device is constructed as a particularly simple, stable and reliable link-motion mechanism 40.

The link-motion mechanism 40 comprises a sliding block which extends in the same direction as the pivotal axes 20 and 21 of the two levers 22 and 23, which is in force-sustained engagement with the two levers in the instantaneous area of overlap of these levers and which is simply formed by a cylindrical pin 41. A carrier device, which is movable transversely of the pivotal axes 20 and 21 of the two levers 22 and 23, is in force-sustained cooperation with the pin 41 and moves the pin 41 along a path which extends through the instantaneous area of overlap of the two levers. The path is defined by the carrier device during the pivotal movement of the two levers between their rest position and their operating position. The carrier device for the pin 41 used as sliding block is formed by a separate actuating member which is a plate-shaped arm 43. The arm 43 is pivotable about a spindle 42 in the apparatus which is movable relative to the two levers 22 and 23, which carries the stationary pin 41, and which guides the pin 41 along a circular path which extends through the instantaneous area of overlap of the two levers. As can be seen in FIG. 2, the plate-shaped arm 43 used as carrier device for the pin 41 is situated between the two plate-shaped levers 22 and 23 viewed along of the pivotal axes, the pin 41 extending through the arm 43 and its free ends each being disposed on one side of the arm 43.

Each of the two levers 22 and 23 is formed with a slot 44 and 45 respectively of substantially arched shape, the slot being a link-motion surface for the link-motion mechanism 40. The slots 44 and 45 extend in the instantaneous area of overlap, correspond to the path of movement of the pin 41 used as sliding block, and also overlap each other in the instantaneous area of overlap of the two levers. The slots 44 and 45 are each disposed in a plane perpendicular to the pivotal axes 20 and 21 of the two levers and to the pin 41. The pin 41 extends in the same direction as the pivotal axes and through the arm 43 and has free ends which each extend through one of the two slots 44 and 45 in the levers. The pin 41 slides along the slots during the pivotal movement of the two levers between their rest position and their operating position and ensures that the pivotal movements of the two levers are accurately coordinated to each other and the two levers always reach their operating position or rest position at the same time. In the present case the clearance between the pin used as sliding block and the slots used as link-motion surfaces may be the same over the entire length of each slot in order to ensure a smooth sliding movement. However, in practice it is found to be effective if the clearance at the ends of the slots is smaller than in the remainder of the slots, because this accurately define the positions of the two levers in their rest position and their operating position. As a result of the choice of the length of the arm 43 and the position of its pivot 42, the path of movement of the pin 41 is a circular path during a pivotal movement of the two levers between their rest and their operating position. This path is such that the force transmission between the pin 41 and the slots 44 and 45 takes place substantially perpendicularly to the bounding walls of these slots, thereby guaranteeing a smooth sliding movement of the pin in the slots and a correct force transmission without the risk of jamming. In the present case the circular path of movement of the pin 41, and the shapes of the slots 44 and 45 are selected in conformity with each other in such a way that pivotal movements of the two levers are so coordinated that the two levers are pivoted uniformly and steadily during each stage of the movement. This steady movement ensures that the tape is guided in a reliable and gentle manner by the tape guides on the levers.

For moving the two levers 22 and 23 between their rest and their operating position, as already stated, a motor driving device 46 comprises a motor 47 whose direction of rotation is reversible. The motor 47 is connected to a rotatable control disk 49 through a self-braking transmission 48, which is for example formed by a self-braking worm gear and is represented symbolically as a dash-dot line. The control disk 49 is formed with a control groove 50 in one major surface. The control groove 50 is engaged by a control pin 51 carried by a control lever 52, which is rigidly connected to the spindle 21 of the lever 23.

In order to pivot the two layers from their rest position to their operating position, for withdrawing the tape 1 from the cassette 10, the control lever 52 should be pivoted counterclockwise, which is effected when the control disk 49 is rotated counterclockwise out of the position shown in FIG. 1. For this purpose the motor 47 is connected to a power supply V through a first switching device 53. Upon actuation of the first switching device 53 the motor 47 is driven in a first direction of rotation, thereby rotating the control disk 49 out of the position shown in FIG. 1 in the counterclockwise direction through the self-braking transmission 48. The control lever 52 is then also pivoted counterclockwise by the control groove 50 via the control pin 51, so as to cause a corresponding pivotal movement of the lever 23. As a result of the coupling of the lever 23 to the lever 22 via the link-motion mechanism 40, the lever 22 is also pivoted in an accurately coordinated manner, the arm 43 carrying the pin 41 is also being moved and thereby moves and guides the pin along a circular path. Just before the operating position of the two levers is reached the U-shaped brackets 26 and 27 butt against the positioning blocks 38 and 39, so that the brackets cannot be moved any further and the pressure springs 28 and 29 acting between the levers and the brackets are compressed. If upon a continued movement the two levers 22 and 23 reach their operating positions, which happens at the same instant as a result of the accurately coordinated movement, a projection 54 on the control disk 49 actuates a first end-position switch 55, which interrupts the circuit for the motor 47 closed by the first switching device 53. As a result of this, the motor 47 stops and the two levers 22 and 23 are maintained in their operating positions via the self-braking transmission 48. During the movement of the two levers from their rest positions to their operating positions the tape guides 30, 31, 32 and 33 on these levers move the tape 1 along, the tape being withdrawn smoothly and gently from the cassette 10 and being wrapped around the tape-guide drum 2. It is obvious that at least one of the two reels 11 and 12 should then be allowed to rotate, in order to enable the tape 1 to be unwound. When the two levers 22 and 23 are in their operating positions, the tape 1 path is as shown in FIG. 2, namely from the first reel 11 via the guide roller 13, the magnetic head 9, the tape guides 30 and 31, the tape-guide drum 2, the tape guides 32 and 33, the magnetic heads 8 and 7, the capstan 5 and the pressure roller 6, the tape-guide pin 19 and the guide roller 15 to the second reel 12. In this situation it is then possible to record signals on or reproduce signals from the tape 1.

In order to return the tape 1 into the cassette 10, the two levers should be moved from their operating positions to their rest positions. For this purpose the motor 47 is connected to the power supply V via a second switching device 56. Upon actuation of the second switching device 56 the motor 47 is driven in a direction of rotation which is opposite to the afore-mentioned first direction of rotation, so that the control disk 49 is rotated clockwise out of the position shown in FIG. 1. This rotation results in a corresponding movement of the control lever 52 and, consequently, a movement of the two levers 22 and 23 from their operating positions to their rest positions via the link-motion mechanism 40. Upon leaving the operating position the pressure spring 28 or 29 acting on each U-shaped bracket 26 or 27, respectively, urges the main body of the relevant bracket against that bounding wall of the rectangular aperture 24 or 25 which faces the free end of the relevant lever. When the two levers reach their rest position, which takes place at the same instant because of the accurately coordinated movement obtained by means of the link-motion mechanism 40, the projection 54 on the control disk 49 actuates a second end-position switch 57, which interrupts the circuit for the motor 47 closed upon an actuation of the second switching device 56. The motor 47 then stops and the two levers are maintained in their rest positions via the self-braking transmission 48.

Upon the pivotal movement of the two levers from their operating positions to their rest positions the tape guides carried by the levers return to their positions inside the recess 17 in the cassette 10, the tape 1 being returned into the cassette 10. It is evident that at least one of the two reels 11 and 12 should then be driven to take up the tape. In this situation the cassette may then be removed from the apparatus and, if desired, replaced by another cassette, upon which the tape guides are again located behind the tape of the other cassette in an absolutely reliable manner.

The driving device 46 for pivoting the two levers 22 and 23 may also act on the arm 43 in a similar manner, in which case the two levers 22 and 23 will also be pivoted in an accurately coordinated manner because the arm 43 is driven via the pin 41 and the slots 44 and 45 of the link-motion mechanism 40.

As will be apparent from the foregoing description, the use of a link-motion mechanism with a sliding block pin on a pivotal arm, which pin passes through a slot, used as a link-motion surface, in a lever for carrying the tape guides provides a particularly simple, stable and reliable coupling between the two levers, which always guarantees an accurately coordinated movement of the two levers and which ensures that the two levers always reach their operating positions or their rest positions at the same time. Since such a pin which slides in slots is subject to hardly any wear, an exact and reliable coupling between the two levers for coordinating their movements is also guaranteed after prolonged use of the apparatus. The use of a pivotal arm as carrier device for the pin is also very simple and results in a compact construction. Since the arm guides the pin along a path which extends substantially perpendicularly to the slots, the force transmission between the pin and the slots of the link-motion mechanism also takes place substantially perpendicularly to the bounding walls of the slots, which guarantees that always a correct and smooth force transmission is obtained. The two slots are each short, which is of advantage for the required space and consequently for a compact construction of the levers of the tape-guide device. By constructing the link-motion surfaces as slots, through which the pin used as sliding block extends, the pin cannot inadvertently be lifted off the link-motion surfaces, this link-motion mechanism being operative both during the movement of the levers to their operating positions and the movement of the levers to their rest positions.

Figure 3:
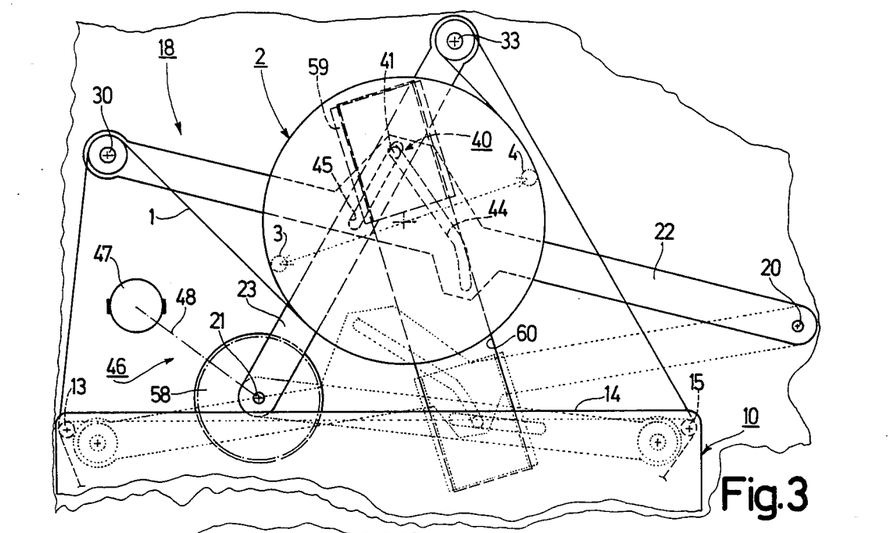
FIG. 3 is a schematic plan view of the relevant parts of a second embodiment of the invention, having a sliding block formed as a pin and a movably guided sliding member, the rest positions of the lever being shown in broken lines and their operating positions in solid lines.

FIG. 3 is even further simplified in comparison with FIGS. 1 and 2 and for the sake of simplicity only shows the tape-guide device 18 for removing the tape 1 from the cassette 10 and for wrapping the tape around the tape-guide drum 2, all the other parts which cooperate with the tape not being shown. In the present case each lever 22 and 23 carries a tape-guide roller 30 and 33 respectively and the driving device 46 for moving the two levers comprises a gear wheel 58 which is rigidly mounted on the spindle 21 of the lever 23 and which can be driven with a constant speed by the motor 47 via the transmission 48 whilst in the present case, an overload clutch is arranged between the motor 47 and the transmission 48. In the same way as in the apparatus shown in FIGS. 1 and 2 the two rollers 30 and 33 may be arranged on the levers 22 and 23 so as to be movable against a spring force, the geometrical positions of the two rollers in the operating position of the two levers being also adjustable by means of a positioning device.

As carrier device for the sliding-block pin 41 of the link-motion mechanism 40 there is again provided a separate actuating member, which is now formed by a sliding member which is slidably guided in a rectilinear guide 60, namely between two positions defined by the ends of the guide 60, in which the two levers 22 and 23, which are coupled to each other via the pin 41 of the link-motion mechanism 40 which extends through the slots 44 and 45 used as link-motion surfaces, occupy their rest positions indicated by the dotted lines and their operating positions indicated by solid lines. As soon as the sliding member 59 butts against one end of its guide the overload clutch arranged between the motor 47 and the transmission 48 of the driving device 46 becomes operative and thereby disengages the drive of the sliding member by the motor. The sliding member 59 is maintained in its positions defined by the ends of the guide as a result of the self-braking action of the transmission 48. The sliding member 59 ensures that the pin 41 of the link-motion mechanism 40 is driven and guided along a rectilinear path in a stable and reliable manner upon a movement of the two levers. In this respect it is to be noted that such a sliding member used as carrier device may also be movably guided along a curved guide, in which case the path of the pin may simply be adapted to specific requirements, for example as regards a smooth and reliable force transmission or a specific coordination of the pivotal movements of the two levers.

As can be seen in FIG. 3, the slot 45 in the lever 23 is simply a straight slot. Further, the rectilinear path of movement of the pin 41 and the shapes of the two slots 44 and 45 have been selected to coordinate the pivotal movements so that similar movements of the two levers 22 and 23 are achieved. In other words, each slot of the link-motion mechanism 40 may be selected so that its shape, its arrangement on the levers and the shape of the path of movement of the pin 41 of the link-motion mechanism are such that each of the two levers performs a substantially similar movement, which guarantees a particularly steady and smooth movement of the two levers.

In this apparatus the two levers are also coupled via a simple link-motion system in an accurate and reliable manner, the two levers each performing accurately coordinated and similar pivotal movements. Since the levers and consequently the tape guides carried by these levers perform similar movements, a particularly smooth, steady and gently withdrawal from or return of the tape into the cassette is achieved. The sliding block formed by a simple pin is then guided in a stable and reliable manner by means of a sliding member which acts as carrier device.

Figure 4:
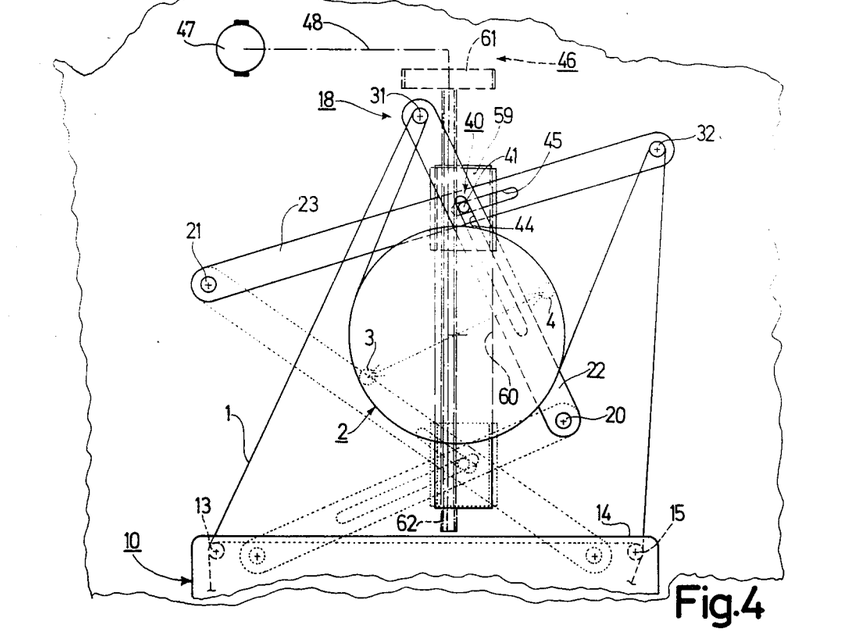
FIG. 4, in the same way as FIG. 3, shows the relevant parts of a third embodiment, in a pin which serves as a sliding block.

In the apparatus shown in FIG. 4 each lever 22 or 23 carries a tape-guide pin 31 or 32, respectively, which pins may each be arranged so as to be movable on the relevant lever. The driving device 46 for moving the two levers is adapted to cooperate with the carrier device formed by the sliding member 59 for the pin 41. For this purpose the motor 47 again drives a gear wheel 61 via an overload clutch and the transmission 48, which gear wheel drives a lead-screw 62. The lead-screw cooperates with a threaded bore in the sliding member 59 which is slidably guided by the guide 60, so that by driving the lead-screw in the opposite directions of rotation the sliding member can be moved in opposite directions, the levers 22 and 23, which are coupled to each other via the pin 41 on the sliding member and the slots 44 and 45 of the link-motion mechanism 40, being pivotable in an accurately coordinated manner between their rest positions shown in dotted lines and their operating positions shown in solid lines.

In this embodiment the slots 44 and 45 of the link-motion mechanism 40 are simply rectilinear slots. As a result of the straight slots and the straight path of movement of the pin used as a sliding block the pivotal movements of the two levers are coordinated in such a way that upon the pivotal movements of the two levers the levers are initially accelerated and are then braked again. In this way a steady and accurately coordinated movement of the two levers is obtained, which again results in the tape being guided in a reliable and gentle manner and which guarantees that the levers again reach their operating positions or their rest positions at the same time.

Figure 5:
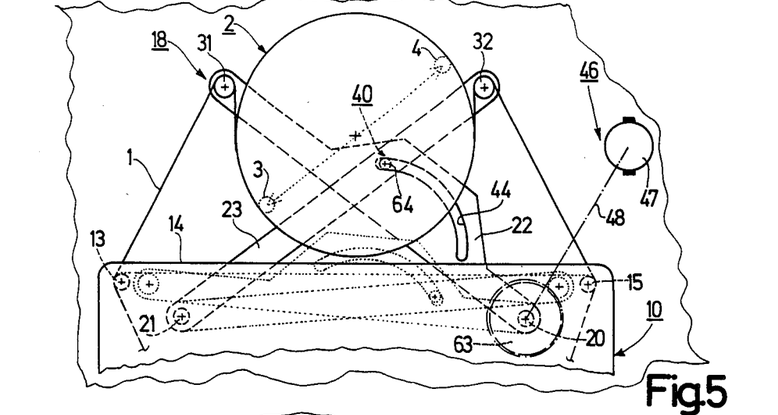
FIG. 5, similarly shows the relevant parts of a fourth embodiment in which the carrier device for a rotatable roller is formed by one of the two levers and in which only the other lever has a slot which receives the roller.

In the apparatus shown in FIG. 5 each lever 22 or 23 carries a tape-guide pin 31 or 32, respectively, and the driving device 46 is constructed in the same way as that of the apparatus shown in FIG. 3, but in the present case a gear wheel 63 is rigidly mounted on the spindle 20 of the lever 22 and driven by the driving device 46.

In this apparatus the carrier device for the sliding block of the link-motion mechanism 40 is simply constituted by the lever 23 itself. The sliding block is constructed as a rotatable roller 64, which is rotatably journalled on the lever 23. The roller 64 extends through an arched slot 44 in the other lever 22, which slot serves as link-motion surface. Upon the movement of the two levers between their rest positions and their operating positions the roller 64 rolls on the bounding walls of the slots 44. Such a rolling movement guarantees a minimal friction and thus a smooth actuation of the two levers. Again the slot 44 and the path of movement of the pin 41, which is again arcuate, are selected to coordinate the pivotal movements of the two levers to each other in such a way that similar movements of the levers 22 and 23 are obtained.

Also in this apparatus a very simple and accurate coupling between the two levers and thus accurately coordinated movements of these levers are achieved. The similar movements of the two levers again guarantee a particularly gentle withdrawal of the tape from or return into the cassette. By arranging the roller used as sliding block on one of the two levers a separate carrier device may be dispensed with. By constructing the sliding block as a roller it rolls on the link-motion surface during the movement of the two levers, which is of advantage for a minimal friction and consequently a smooth movement.

Figure 6:
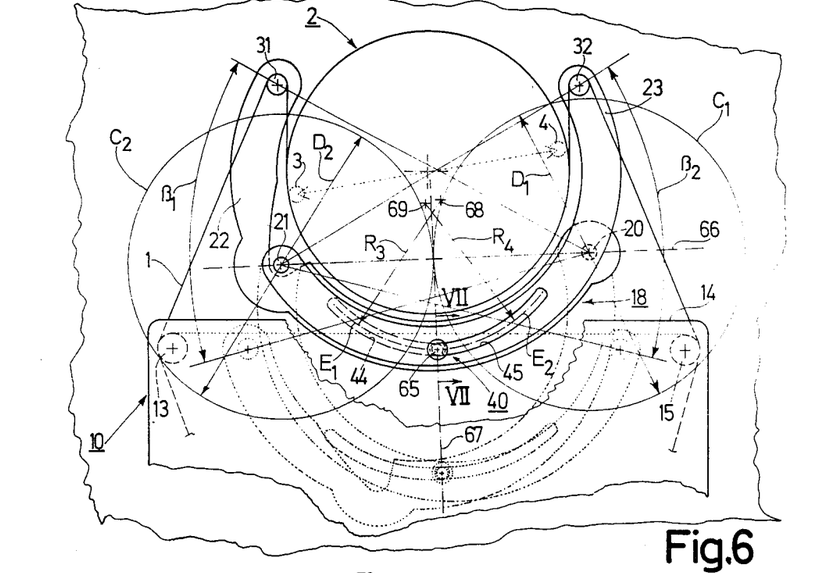
FIG. 6 similarly, shows the relevant part of a fifth embodiment in which the carrier device for a pin-shaped sliding block is formed by the two levers, which each have a link-motion slot with a circularly involute shape.

In the apparatus shown in FIG. 6 each of the levers 22 and 23 carries a tape-guide pin 31 or 32, respectively, which is arranged so as to be movable on the relevant lever 22 or 23 in the same way as in the apparatus shown in FIGS. 1 and 2, in order to guarantee an accurate positioning of the pin by means of a positioning device when the levers are in their operating positions, in the same way as in the apparatus shown in FIGS. 1 and 2. However, for the sake of simplicity this is not shown, because this is not essential for the present invention. A driving device for driving the two levers 22 and 23, which is not shown for the sake of simplicity, may be constructed in exactly the same way as in the apparatus shown in FIGS. 1 and 2 and drive one of the two levers. For driving the two levers there may also be provided a motor-driven gear wheel on one of the two spindles 20 and 21 in the same way as in the apparatus shown in FIGS. 3 and 5.

For coordinating their pivotal movements the two levers 22 and 23 are coupled to each other via a link-motion mechanism 40, whose sliding block is constituted by a cylindrical pin 65. The carrier device for the sliding block formed by the pin 65 is now constituted by one of the two levers 22 and 23 themselves, so that a separate carrier device may be dispensed with. The two levers 22 and 23 are each formed with a slot 44 and 45, respectively, as a link-motion surface. The two slots 44 and 45 overlap each other in the instantaneous area of overlap of the two levers and the pin 65 floats in these slots in this area of overlap, which will be described in detail with reference to FIG. 7. The shape of each slot 44 or 45 corresponds substantially to a portion of a circular involute, $E_1$ or $E_2$, respectively, whose base circles, $C_1$ and $C_2$ respectively, are centered on the pivotal axes 20 and 21, respectively, of the relevant levers, 22 and 23, respectively, in which the slots 44 and 45, respectively are formed. The two base circles $C_1$ and $C_2$ of the circular involutes $E_1$ and $E_2$ are a tangent to each other in a plane 66, which extends perpendicularly to the two pivotal axes 20 and 21 and which is represented by a dash-dot line in FIG. 6, along a tangent line which is also indicated by a dash-dot line, and the ratio of their diameters $D_1$ and $D_2$ is inversely proportional to the ratio of the pivoting angles $\beta_1$ and $\beta_2$ of the levers 22 and 23, respectively. In the present case the central portions of the two portions of the circular involutes $E_1$ and $E_2$ each comprise in good approximation by a portion of a circle of curvature of the circular involutes, because this simplifies the formation of these slots. The centres of these two circles of curvature are designated 68 and 69 in FIG. 6 their radii, shown as dash-dot lines, are designated $R_3$ and $R_4$.

Figure 7:
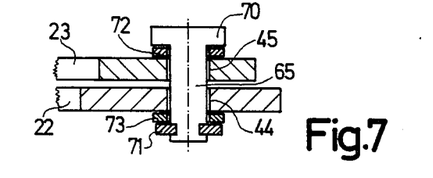
FIG. 7 is a sectional view, on an enlarged scale, of the floating link-motion pin of the embodiment of FIG. 6 and taken on the line VII—VII.

The sliding block formed by the pin 65 floats in the two slots 44 and 45. The pin 65 is movable along the slots 44 and 45 and is guided by the two levers 22 and 23 themselves in their axial directions. As is shown in FIG.

7, one end of the pin 65 comprises a portion 70 of larger diameter and on the other end of the pin a retaining ring 71 is fitted. Between the portion 70 of the pin 65 and the lever 23 and between the lever 22 and the retaining ring 71 a washer 72 and 73 respectively, is fitted onto the pin in order to minimize the friction.

As a result of the slots of the previously described circularly involute shape, it is achieved that the forces acting between the pin 65 and each of the slots 44 and 45, respectively, are always such that the slots 44 and 45 move the pin 65 along the said tangent line 67 during the pivotal movements of the levers 22 and 23. In other words, the levers 22 and 23 formed with the slots serve as carrier device for the sliding block and always move and guide this block accurately along the rectilinear path defined by the tangent line 67. As a result of the rectilinear path of the pin 65 and the circularly involute shape of the slots 44 and 45 used as link-motion surfaces the pivotal movements of the two levers 22 and 23 are coordinated in such a way that during the pivotal movements of the levers which are coupled to each other via the link-motion mechanism 40 these levers each perform a similar pivotal movement corresponding to a rolling movement of the two base circles $C_1$ and $C_2$ of the circular involutes $E_1$ and $E_2$ relative to each other. Moreover, by the choice of the path of the sliding block and the shape of the slots which serve as link-motion surfaces it is achieved that during the pivotal movements of the two levers the forces acting between the sliding block and the slots are always directed perpendicularly to the bounding walls of the slots, so that always a smooth and correct force transmission via the link-motion mechanism is guaranteed. In this way it is also ensured that in the present apparatus the movements of the two levers 22 and 23 of the tape-guide device 18 are coordinated accurately, so that a reliable, uniform and gentle guidance of the tape 1 by the tape guides 31 and 32 is ensured and the two levers always reach their operating positions or rest positions at the same time. Since the two levers also function as a carrier device for the sliding block, a separate carrier device may be dispensed with, thus providing a simple and compact construction. As the path of the sliding block movement is short relative to the two slots which are each formed in one of the levers, the slots themselves may also be short so that these levers have a compact construction and do not occupy much space.

Figure 8:
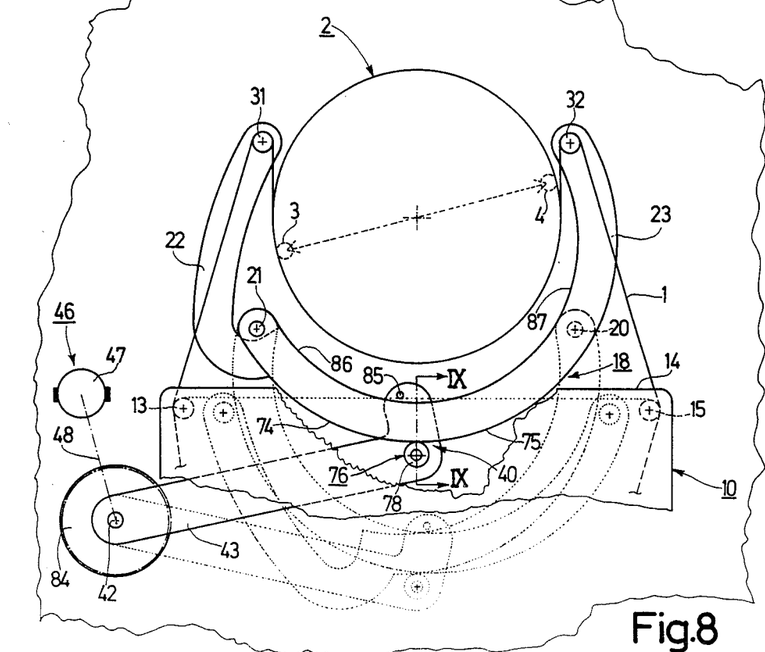
FIG. 8, in the same way as FIG. 3, shows the relevant parts of a sixth embodiment, in which the sliding block comprises two rollers on a pivotable arm serving as carrier device, which are each independently rotatable and cooperate with a lever side wall which serves as a link-motion surface.

In the apparatus shown in FIG. 8 the link-motion mechanism 40 for coupling the two levers 22 and 23 has a link-motion surface on each lever, which surface is now simply formed on a side wall, 74 and 75, respectively, of the relevant levers 22 and 23. The two side walls 74 and 75 each have the shape of an arc of circle. The sliding block 76 of the link-motion mechanism 40 in this apparatus comprises a rotatable roller 77 and 78, respectively, for cooperation with each of the side walls, 74 and 75 respectively, serving as link-motion surfaces, as can be seen from FIG. 9. The two rollers 77 and 78 are rotatably mounted on a common spindle 81 by means of two retaining rings 79 and 80. The central portion of the spindle 81 is rigidly mounted in an arm 43 which is pivotal about a pivotal axis 42, the spindle 81 extending through the arm 43 and a washer, 82 and 83 respectively, being slid onto the spindle 81 between the arm 43 and each of the two rollers, 77 and 78 respectively.

Figure 9:
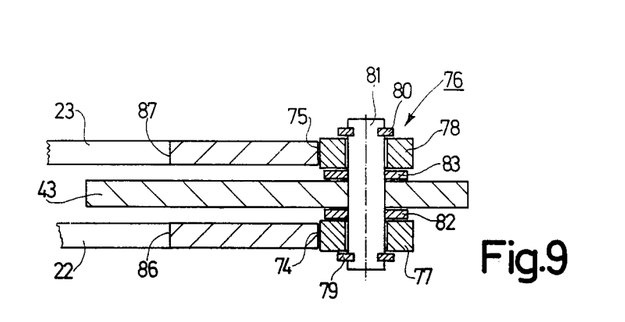
FIG. 9 is an enlarged sectional view, taken on the line IX—IX in FIG. 8, of the sliding block.

The arm 43 again forms the carrier device for the sliding block 76, which guides the member accurately and reliably along a predetermined path, namely a circular path. As can be seen in FIG. 9, the arm 43 is situated between the two levers 22 and 23, viewed along the pivotal axes 20 and 21. The sliding block 76 extends through the arm 43 with its spindle 81, as already stated, and its roller 77 and 78 which are mounted on each of the two free ends and which are rotatable about the spindles 81 are in force-sustained engagement with the two side walls 74 and 75 of the two levers which acts as link-motion surfaces, so that substantially symmetrical forces obtain relative to the arm.

For driving the two levers 22 and 23 which are coupled to each other via the link-motion mechanism 40 the motor-drive device 46 comprises a motor 47, which drives a gear wheel 84 on the spindle 42 of the arm 43 via an overload clutch and the self-braking transmission 48. For stopping the motor 47 when the two levers 22 and 23 reach their operating positions or their rest positions, it is for example possible, in the same way as in construction used in the apparatus shown in FIGS. 1 and 2, to employ two end-position switches, which cooperate with a projection on the gear wheel 84. Alternatively, there may be provided two end-position switches which cooperate with the arm 43.

When the gear wheel 84 is driven in the counter clockwise direction, the arm 43 is also pivoted counterclockwise, thereby moving and guiding the sliding block 76 along a circular path. Via the two rollers 77 and 78 of the sliding block, which are in force-sustained engagement with the side walls 74 and 75 of the two levers, the two levers 22 and 23 are moved along and pivoted from their rest positions to their operating positions. The two rollers 77 and 78 then roll on the side walls 74 and 75 of the two levers in opposite directions of rotation, which is of advantage for a minimal friction of the link-motion mechanism and thus for a smooth operation of the two levers. As a result of the coupling via the link-motion mechanism the pivotal movements of the two levers are accurately coordinated to each other.

In the present apparatus the choice of the path of movement of the sliding block and the shape of each of the two side walls forming the link-motion surfaces results in such a coordination of the pivotal movements of the two levers that during the pivotal movements from the rest positions into the operating positions the lever 23 is initially moved slightly faster than the lever 22 so that the lever 23 has a slide lead relative to the lever 22, and at the end of this pivotal movement the lever 23 is moved slightly more slowly than the lever 22, so that the lever 22 again lags relative to the lever 23, the two levers 22 and 23 reaching their operating positions at the same time at the end of this pivotal movement. During this pivotal movement of the levers 22 and 23 from their rest positions to their operating positions the tape guides 31 and 32 again withdraw the tape 1 from the cassette 10 in a smooth and gentle manner and keep it wrapped around the tape-guide drum 2 in a reliable manner when the operating position of the two levers is reched.

In order to return the two levers 22 and 23 from their operating positions to their rest positions, the gear wheel 84 is driven in the clockwise direction, which results in a clockwise pivotal movement of the arm 43. The arm 43 carries a pin 85 which extends through this arm and whose two free ends are in force-sustained engagement with the side walls 86 and 87 of the levers 22 and 23 when the arm is pivoted clockwise. As a result of this, the two levers 22 and 23 are returned from their operating positions to their rest positions via the pin 85 which is driven by the arm 43 and which cooperates with the side walls 86 and 87 of these levers.

It is evident that also in the apparatus shown in FIG. 8 the pivotal movement of the two levers are accurately coordinated and thereby ensure a smooth and gently withdrawal of the tape from the cassette and a correct wrapping of this tape around the tape-guide drum. As the side walls of the levers are also used as link-motion surfaces a very simple and stable construction of the levers is obtained. Since the sliding block rolls on the relevant link-motion surfaces a particularly favourable friction of the link-motion mechanism is obtained, which is of advantage for a smooth operation. Since the two rollers of the sliding block are each disposed on one side of the arm, symmetrical forces obtain in the cooperation of the sliding block with the levers, so that the arm and its pivot are not subjected to torsional loads. It is to be noted that the two rollers of the sliding block may also be journalled rotatably on separate spindles, which may then be arranged non-coaxially. If desired, the two rollers of the sliding block may have different diameters.

As appears from the embodiments described in the foregoing differently coordinated pivotal movements of the two levers are obtained by a corresponding choice of the paths of movement of the sliding blocks and the shapes of the link-motion surfaces. It will be appreciated that other arbitrarily coordinated movements can be obtained, for example in such a way that one lever is accelerated during one stage of the movement and the other lever moves uniformly or is slowed down.

What is claimed is:

1. A helical scan cassette recorder for use with a cassette containing a record carrier tape and having at least one aperture for withdrawing the tape from the cassette after the cassette has been inserted into the recorder, comprising
    a tape guide drum having a circumferential surface, and a tape guide device comprising two levers each supporting a respective tape guide which levers are pivotable about two parallel pivotal axes, and are arranged to overlap each other at an area of overlap which varies as the levers are pivoted, a driving device for pivoting said levers between a rest position and an operating position, and a coupling device which acts directly on said levers for coordinating their pivotal movements; in the rest position said guides being located behind the tape within the cassette at the location of the aperture in said cassette; during movement from the rest position to the operating position, said guides pulling a length of the tape from within the cassette and wrapping said length of tape around the tape guide drum; and in the operating position said tape guides keeping the record carrier wrapped around said drum; characterized in that the coupling device includes a link-motion mechanism comprising a sliding block which extends in the same direction as the pivotal axes of the two levers, a carrier device arranged to be movable transversely of the pivotal axes, a link-motion surface on a least one of said levers, means for urging the sliding block against the link-motion surface, and means for maintaining said sliding block in force-sustained cooperation with said carrier device,
    said carrier device moving said sliding block along a path of movement defined by the carrier device and extending through an area of instantaneous overlap of said two levers,
    said sliding block being in force-sustained engagement with said two levers at the location of the area of instantaneous overlap, engagement of the block with said one lever being provided by said means for urging said carrier device moving said sliding block along a path of movement which is defined by the carrier device and which extends through the area of instantaneous overlap of the two levers.

2. A recorder as claimed in claim 1, characterized in that the link-motion surface is formed on a side wall of said at least one lever.

3. A recorder as claimed in claim 1, characterized in that said sliding block is a cylindrical pin.

4. A recorder as claimed in claim 1, characterized in that the sliding block comprises a rotatable roller arranged to cooperate with at least one link-motion surface.

5. A recorder as claimed in claim 1, characterized in that the link-motion surface with which the sliding block is in force-sustained engagement is formed on one lever, and the carrier device for the sliding block is formed by the other of the two levers.

6. A recorder as claimed in claim 5, characterized in that the link-motion surface is formed on a side wall of said one lever.

7. A recorder as claimed in claim 1, characterized in that each of said levers includes a slot forming a link-motion surface, the slot having a shape substantially corresponding to a portion of a circular involute whose base circle is concentric with the pivotal axis of the respective lever, the base circles being tangent to each other at a line which extends perpendicularly to a plane in which the two pivotal axes lie, a ratio of the diameters of said two base circles being inversely proportional to a ratio of the pivoting angles of the two levers; said slots overlapping each other at the area of instantaneous overlap of the two levers, and said sliding block floating in said slots in said area of overlap.

8. A recorder as claimed in claim 7, characterized in that the sliding block is a cylindrical pin.

9. A recorder as claimed in claim 3, characterized in that the sliding block comprises a rotatable roller arranged to cooperate with at least one link-motion surface.

10. A recorder as claimed in claim 1, characterized by comprising two said link-motion surfaces, one formed on each respective laver, said surfaces overlapping each other at the location of the area of instantaneous overlap of the levers; and in that said carrier device is a separate actuating member which is movable relative to the two levers, and the sliding block is in force-sustained engagement with the two link-motion surfaces at said location of area of overlap.

11. A recorder as claimed in claim 10, characterized in that said separate actuating element is a sliding member slidable along a guide.

12. A recorder as claimed in claim 10, characterized in that said separate actuating member is a pivotally journalled arm.

13. A recorder as claimed in claim 12, characterized in that, as viewed along the pivotal axes, the arm is disposed between the two levers, and the sliding block extends through the arm and has two free ends, each in force-sustained engagement with a respective one of said link-motion surfaces.

14. A recorder as claimed in claim 13, characterized in that the link-motion surfaces are formed on respective side/walls of said levers.

15. The recorder as claimed in any one of claims 1 2, 5, 6, 10, 11, 12, 13 or 14, characterized in that the link-motion surface is formed by a slot in the lever on which said surface is formed, said sliding block extending through said slot.

16. A recorder as claimed in claim 15, characterized in that said sliding block is a cylindrical pin.

17. A recorder as claimed in claim 15, characterized in that the sliding block comprises a rotatable roller arranged to cooperate with at least one link-motion surface.

* * * * *

UNITED STATES PATENT AND TRADEMARK OFFICE
CERTIFICATE OF CORRECTION

PATENT NO. : 4,563,717
DATED : Jan. 7, 1986
INVENTOR(S) : HAROLD FLECK ET AL

It is certified that error appears in the above-identified patent and that said Letters Patent is hereby corrected as shown below:

IN THE CLAIMS:

Claim 1, line 8, ( Col. 15, line 43) after "guide" insert --,--
 line 42, (Col. 16, line 9) change " said carrier device moving said " to --.--(period);

lines 43-46, (Col. 16, lines 10-13) delete in their entirety.

Claim 14, line 3 (Col. 17, line 5) change "side/walls" to --side walls--

Signed and Sealed this

Twenty-seventh Day of October, 1987

Attest:

DONALD J. QUIGG

*Attesting Officer*  *Commissioner of Patents and Trademarks*